(12) United States Patent
Dyer et al.

(10) Patent No.: US 9,249,559 B2
(45) Date of Patent: Feb. 2, 2016

(54) PROVIDING EQUIPMENT IN LATERAL BRANCHES OF A WELL

(75) Inventors: Stephen Dyer, Al Khobar (SA); John Algeroy, Houston, TX (US); Marian Faur, Palaiseau (FR); Omer Gurpinar, Denver, CO (US)

(73) Assignee: SCHLUMBERGER TECHNOLOGY CORPORATION, Houston, TX (US)

( * ) Notice: Subject to any disclaimer, the term of this patent is extended or adjusted under 35 U.S.C. 154(b) by 572 days.

(21) Appl. No.: 13/356,060

(22) Filed: Jan. 23, 2012

(65) Prior Publication Data

US 2013/0081807 A1 Apr. 4, 2013

Related U.S. Application Data

(60) Provisional application No. 61/543,100, filed on Oct. 4, 2011.

(51) Int. Cl.
| | |
|---|---|
| *E21B 47/00* | (2012.01) |
| *E03B 3/14* | (2006.01) |
| *E21B 47/12* | (2012.01) |
| *E21B 41/00* | (2006.01) |

(52) U.S. Cl.
CPC ............. *E03B 3/14* (2013.01); *E21B 41/0035* (2013.01); *E21B 47/12* (2013.01)

(58) Field of Classification Search
USPC ........ 166/254.2, 66, 50, 250.01, 266; 175/48, 175/50
See application file for complete search history.

(56) References Cited

U.S. PATENT DOCUMENTS

| | | | |
|---|---|---|---|
| 2,214,064 A | 9/1940 | Niles | |
| 2,379,800 A | 7/1945 | Hare | |
| 2,452,920 A | 11/1948 | Gilbert | |
| 2,470,303 A | 5/1949 | Greenough | |
| 2,782,365 A | 2/1957 | Castel | |
| 2,797,893 A | 7/1957 | McCune et al. | |
| 2,889,880 A | 6/1959 | Hughes | |
| 3,011,342 A | 12/1961 | Simm | |
| 3,199,592 A | 8/1965 | Jacob | |
| 3,206,537 A | 9/1965 | Steward | |
| 3,344,860 A | 10/1967 | Voetter | |
| 3,363,692 A | 1/1968 | Bishop | |
| 3,659,259 A | 4/1972 | Chaney, Jr. et al. | |
| 3,913,398 A | 10/1975 | Curtis | |

(Continued)

FOREIGN PATENT DOCUMENTS

| | | |
|---|---|---|
| EP | 795679 A2 | 9/1997 |
| EP | 823534 A1 | 2/1998 |

(Continued)

OTHER PUBLICATIONS

Brown, G.A., SPE 62952. "Using Fibre-Optic Distributed Temperature Measurements to Provide Real-Time Reservoir Surveillance Data on Wytch Farm Field Horizontal Extended-Reach Wells" Society of Petroleum Engineers Inc. 2000, pp. 1-11.

(Continued)

*Primary Examiner* — Taras P Bemko
(74) *Attorney, Agent, or Firm* — David J. Groesbeck

(57) ABSTRACT

First equipment is provided in a first lateral branch of a well, and second equipment in a second lateral branch of the well. Cross-lateral logging is performed using the first and second equipment in the corresponding first and second lateral branches.

22 Claims, 10 Drawing Sheets

(56) References Cited

U.S. PATENT DOCUMENTS

| | | |
|---|---|---|
| 4,027,286 A | 5/1977 | Marosko |
| 4,133,384 A | 1/1979 | Allen et al. |
| 4,241,787 A | 12/1980 | Price |
| 4,415,205 A | 11/1983 | Rehm et al. |
| 4,484,628 A | 11/1984 | Lanmon, II |
| 4,559,818 A | 12/1985 | Tsang et al. |
| 4,573,541 A | 3/1986 | Josse et al. |
| 4,597,290 A | 7/1986 | Bourdet et al. |
| 4,733,729 A | 3/1988 | Copeland |
| 4,806,928 A | 2/1989 | Veneruso |
| 4,850,430 A | 7/1989 | Copeland et al. |
| 4,901,069 A | 2/1990 | Veneruso |
| 4,945,995 A | 8/1990 | Tholance et al. |
| 4,953,636 A | 9/1990 | Mohn |
| 4,969,523 A | 11/1990 | Martin et al. |
| 5,183,110 A | 2/1993 | Logan et al. |
| 5,269,377 A | 12/1993 | Martin |
| 5,278,550 A | 1/1994 | Rhein-Knudsen et al. |
| 5,301,760 A | 4/1994 | Graham |
| 5,311,936 A | 5/1994 | McNair et al. |
| 5,318,121 A | 6/1994 | Brockman et al. |
| 5,318,122 A | 6/1994 | Murray et al. |
| 5,322,127 A | 6/1994 | McNair et al. |
| 5,325,924 A | 7/1994 | Bangert et al. |
| 5,330,007 A | 7/1994 | Collins et al. |
| 5,337,808 A | 8/1994 | Graham |
| 5,353,876 A | 10/1994 | Curington et al. |
| 5,388,648 A | 2/1995 | Jordan, Jr. |
| 5,398,754 A | 3/1995 | Dinhoble |
| 5,411,082 A | 5/1995 | Kennedy |
| 5,427,177 A | 6/1995 | Jordan, Jr. et al. |
| 5,435,392 A | 7/1995 | Kennedy |
| 5,439,051 A | 8/1995 | Kennedy et al. |
| 5,454,430 A | 10/1995 | Kennedy et al. |
| 5,457,988 A | 10/1995 | Delatorre |
| 5,458,199 A | 10/1995 | Collins et al. |
| 5,458,209 A | 10/1995 | Hayes et al. |
| 5,462,120 A | 10/1995 | Gondouin |
| 5,472,048 A | 12/1995 | Kennedy et al. |
| 5,474,131 A | 12/1995 | Jordan, Jr. et al. |
| 5,477,923 A | 12/1995 | Jordan, Jr. et al. |
| 5,477,925 A | 12/1995 | Trahan et al. |
| 5,499,680 A | 3/1996 | Walter et al. |
| 5,520,252 A | 5/1996 | McNair |
| 5,521,592 A | 5/1996 | Veneruso |
| 5,533,573 A | 7/1996 | Jordan, Jr. et al. |
| 5,542,472 A | 8/1996 | Pringle et al. |
| 5,597,042 A | 1/1997 | Tubel et al. |
| 5,655,602 A | 8/1997 | Collins |
| 5,680,901 A | 10/1997 | Gardes |
| 5,697,445 A | 12/1997 | Graham |
| 5,706,896 A | 1/1998 | Tubel et al. |
| 5,730,219 A | 3/1998 | Tubel et al. |
| 5,823,263 A | 10/1998 | Morris et al. |
| 5,831,156 A | 11/1998 | Mullins |
| 5,871,047 A | 2/1999 | Spath et al. |
| 5,871,052 A | 2/1999 | Benson et al. |
| 5,875,847 A | 3/1999 | Forsyth |
| 5,915,474 A | 6/1999 | Buytaert et al. |
| 5,918,669 A | 7/1999 | Morris et al. |
| 5,941,307 A | 8/1999 | Tubel |
| 5,941,308 A | 8/1999 | Malone et al. |
| 5,944,107 A | 8/1999 | Ohmer |
| 5,944,108 A | 8/1999 | Baugh et al. |
| 5,944,109 A | 8/1999 | Longbottom |
| 5,945,923 A | 8/1999 | Soulier |
| 5,954,134 A | 9/1999 | Longbottom |
| 5,959,547 A | 9/1999 | Tubel et al. |
| 5,960,873 A | 10/1999 | Alexander et al. |
| 5,967,816 A | 10/1999 | Sampa et al. |
| 5,971,072 A | 10/1999 | Huber et al. |
| 5,975,204 A | 11/1999 | Tubel et al. |
| 5,979,559 A | 11/1999 | Kennedy |
| 5,992,519 A | 11/1999 | Ramakrishnan et al. |
| 6,003,606 A | 12/1999 | Moore et al. |
| 6,006,832 A | 12/1999 | Tubel et al. |
| 6,035,937 A | 3/2000 | Gano et al. |
| 6,046,685 A | 4/2000 | Tubel |
| 6,061,000 A | 5/2000 | Edwards |
| 6,065,209 A | 5/2000 | Gondouin |
| 6,065,543 A | 5/2000 | Gano et al. |
| 6,073,697 A | 6/2000 | Parlin et al. |
| 6,076,046 A | 6/2000 | Vasudevan et al. |
| 6,079,488 A | 6/2000 | Begg et al. |
| 6,079,494 A | 6/2000 | Longbottom et al. |
| 6,119,780 A | 9/2000 | Christmas |
| 6,125,937 A | 10/2000 | Longbottom et al. |
| 6,173,772 B1 | 1/2001 | Vaynshteyn |
| 6,173,788 B1 | 1/2001 | Lembcke et al. |
| 6,176,308 B1 | 1/2001 | Pearson |
| 6,176,312 B1 | 1/2001 | Tubel et al. |
| 6,192,980 B1 | 2/2001 | Tubel et al. |
| 6,192,988 B1 | 2/2001 | Tubel |
| 6,196,312 B1 | 3/2001 | Collins et al. |
| 6,209,648 B1 | 4/2001 | Ohmer et al. |
| 6,244,337 B1 | 6/2001 | Cumming et al. |
| 6,302,203 B1 | 10/2001 | Rayssiguier et al. |
| 6,305,469 B1 | 10/2001 | Coenen et al. |
| 6,310,559 B1 | 10/2001 | Laborde et al. |
| 6,318,469 B1 | 11/2001 | Patel |
| 6,328,111 B1 | 12/2001 | Bearden et al. |
| 6,349,770 B1 | 2/2002 | Brooks et al. |
| 6,354,378 B1 | 3/2002 | Patel |
| 6,360,820 B1 | 3/2002 | Laborde et al. |
| 6,374,913 B1 | 4/2002 | Robbins et al. |
| 6,378,610 B2 | 4/2002 | Rayssiguier et al. |
| 6,415,864 B1 | 7/2002 | Ramakrishnan et al. |
| 6,419,022 B1 | 7/2002 | Jernigan et al. |
| 6,457,522 B1 | 10/2002 | Bangash et al. |
| 6,481,494 B1 | 11/2002 | Dusterhoft et al. |
| 6,510,899 B1 | 1/2003 | Sheiretov et al. |
| 6,513,599 B1 | 2/2003 | Bixenman et al. |
| 6,515,592 B1 | 2/2003 | Babour et al. |
| 6,533,039 B2 | 3/2003 | Rivas et al. |
| 6,568,469 B2 | 5/2003 | Ohmer et al. |
| 6,577,244 B1 | 6/2003 | Clark et al. |
| 6,588,507 B2 | 7/2003 | Dusterhoft et al. |
| 6,614,229 B1 | 9/2003 | Clark et al. |
| 6,614,716 B2 | 9/2003 | Plona et al. |
| 6,618,677 B1 | 9/2003 | Brown |
| 6,668,922 B2 | 12/2003 | Ziauddin et al. |
| 6,675,892 B2 | 1/2004 | Kuchuk et al. |
| 6,679,324 B2 | 1/2004 | Den Boer et al. |
| 6,695,052 B2 | 2/2004 | Branstetter et al. |
| 6,702,015 B2 | 3/2004 | Fielder, III et al. |
| 6,727,827 B1 | 4/2004 | Edwards et al. |
| 6,749,022 B1 | 6/2004 | Fredd |
| 6,751,556 B2 | 6/2004 | Schroeder et al. |
| 6,758,271 B1 | 7/2004 | Smith |
| 6,768,700 B2 | 7/2004 | Veneruso et al. |
| 6,776,256 B2 | 8/2004 | Kostyuchenko et al. |
| 6,787,758 B2 | 9/2004 | Tubel et al. |
| 6,789,621 B2 | 9/2004 | Wetzel et al. |
| 6,789,937 B2 | 9/2004 | Haddad et al. |
| 6,817,410 B2 | 11/2004 | Wetzel et al. |
| 6,828,547 B2 | 12/2004 | Tubel et al. |
| 6,837,310 B2 | 1/2005 | Martin |
| 6,842,700 B2 | 1/2005 | Poe |
| 6,845,819 B2 | 1/2005 | Barrett et al. |
| 6,848,510 B2 | 2/2005 | Bixenman et al. |
| 6,856,255 B2 | 2/2005 | Chalitsios et al. |
| 6,857,475 B2 | 2/2005 | Johnson |
| 6,863,127 B2 | 3/2005 | Clark et al. |
| 6,863,129 B2 | 3/2005 | Ohmer et al. |
| 6,864,801 B2 | 3/2005 | Tabanou et al. |
| 6,896,074 B2 | 5/2005 | Cook et al. |
| 6,903,660 B2 | 6/2005 | Clark et al. |
| 6,911,418 B2 | 6/2005 | Frenier |
| 6,913,083 B2 | 7/2005 | Smith |
| 6,920,395 B2 | 7/2005 | Brown |
| 6,942,033 B2 | 9/2005 | Brooks et al. |
| 6,950,034 B2 | 9/2005 | Pacault et al. |
| 6,975,243 B2 | 12/2005 | Clark et al. |
| 6,978,833 B2 | 12/2005 | Salamitou et al. |

(56) References Cited

U.S. PATENT DOCUMENTS

| | | |
|---|---|---|
| 6,980,940 B1 | 12/2005 | Gurpinar et al. |
| 6,983,796 B2 | 1/2006 | Bayne et al. |
| 6,989,764 B2 | 1/2006 | Thomeer et al. |
| 7,000,696 B2 | 2/2006 | Harkins |
| 7,000,697 B2 | 2/2006 | Goode et al. |
| 7,007,756 B2 | 3/2006 | Lerche et al. |
| 7,040,402 B2 | 5/2006 | Vercaemer |
| 7,040,415 B2 | 5/2006 | Boyle et al. |
| 7,055,604 B2 | 6/2006 | Jee et al. |
| 7,063,143 B2 | 6/2006 | Tilton et al. |
| 7,079,952 B2 | 7/2006 | Thomas et al. |
| 7,083,452 B2 | 8/2006 | Eriksson et al. |
| 7,093,661 B2 | 8/2006 | Olsen |
| 2001/0013410 A1 | 8/2001 | Beck et al. |
| 2002/0007948 A1 | 1/2002 | Bayne et al. |
| 2002/0020533 A1* | 2/2002 | Tubel ........................ 166/313 |
| 2002/0050361 A1 | 5/2002 | Shaw et al. |
| 2002/0096333 A1 | 7/2002 | Johnson et al. |
| 2002/0112857 A1 | 8/2002 | Ohmer et al. |
| 2003/0137302 A1 | 7/2003 | Clark et al. |
| 2003/0137429 A1 | 7/2003 | Clark et al. |
| 2003/0141872 A1 | 7/2003 | Clark et al. |
| 2003/0150622 A1 | 8/2003 | Patel et al. |
| 2003/0220750 A1* | 11/2003 | Delhomme et al. ............ 702/50 |
| 2003/0221829 A1 | 12/2003 | Patel et al. |
| 2004/0010374 A1 | 1/2004 | Raghuraman et al. |
| 2004/0094303 A1 | 5/2004 | Brockman et al. |
| 2004/0164838 A1 | 8/2004 | Hall et al. |
| 2004/0173350 A1 | 9/2004 | Wetzel et al. |
| 2004/0173352 A1 | 9/2004 | Mullen et al. |
| 2004/0194950 A1 | 10/2004 | Restarick et al. |
| 2004/0238168 A1 | 12/2004 | Echols |
| 2005/0072564 A1 | 4/2005 | Grigsby et al. |
| 2005/0074210 A1 | 4/2005 | Grigsby et al. |
| 2005/0083064 A1 | 4/2005 | Homan et al. |
| 2005/0087368 A1 | 4/2005 | Boyle et al. |
| 2005/0092488 A1 | 5/2005 | Rodet et al. |
| 2005/0092501 A1 | 5/2005 | Chavers et al. |
| 2005/0115741 A1 | 6/2005 | Terry et al. |
| 2005/0149264 A1 | 7/2005 | Tarvin et al. |
| 2005/0168349 A1 | 8/2005 | Huang et al. |
| 2005/0178554 A1 | 8/2005 | Hromas et al. |
| 2005/0194150 A1 | 9/2005 | Ringgenberg |
| 2005/0199401 A1 | 9/2005 | Patel et al. |
| 2005/0236161 A1 | 10/2005 | Gay et al. |
| 2005/0274513 A1 | 12/2005 | Schultz et al. |
| 2005/0279510 A1 | 12/2005 | Patel et al. |
| 2006/0000604 A1 | 1/2006 | Jenkins et al. |
| 2006/0000618 A1 | 1/2006 | Cho et al. |
| 2006/0006656 A1 | 1/2006 | Smedstad |
| 2006/0016593 A1 | 1/2006 | Gambier |
| 2006/0042795 A1 | 3/2006 | Richards |
| 2006/0060352 A1 | 3/2006 | Vidrine et al. |
| 2006/0065444 A1 | 3/2006 | Hall et al. |
| 2006/0077757 A1 | 4/2006 | Cox et al. |
| 2006/0086498 A1 | 4/2006 | Wetzel et al. |
| 2006/0090892 A1 | 5/2006 | Wetzel et al. |
| 2006/0090893 A1 | 5/2006 | Sheffield |
| 2006/0124297 A1 | 6/2006 | Ohmer |
| 2006/0124318 A1 | 6/2006 | Sheffield |
| 2006/0162934 A1 | 7/2006 | Shepler |
| 2006/0196660 A1 | 9/2006 | Patel |
| 2006/0225926 A1 | 10/2006 | Madhavan et al. |
| 2006/0254767 A1 | 11/2006 | Pabon et al. |
| 2006/0283606 A1 | 12/2006 | Partouche et al. |
| 2007/0012436 A1 | 1/2007 | Freyer |
| 2007/0027245 A1 | 2/2007 | Vaidya et al. |
| 2007/0044964 A1 | 3/2007 | Grigar et al. |
| 2007/0059166 A1 | 3/2007 | Sheth et al. |
| 2007/0062710 A1 | 3/2007 | Pelletier et al. |
| 2007/0074872 A1 | 4/2007 | Du et al. |
| 2007/0107907 A1 | 5/2007 | Smedstad et al. |
| 2007/0110593 A1 | 5/2007 | Sheth et al. |
| 2007/0116560 A1 | 5/2007 | Eslinger |
| 2007/0142547 A1 | 6/2007 | Vaidya et al. |
| 2007/0144738 A1 | 6/2007 | Sugiyama et al. |
| 2007/0144746 A1 | 6/2007 | Jonas |
| 2007/0151724 A1 | 7/2007 | Ohmer et al. |
| 2007/0159351 A1 | 7/2007 | Madhavan et al. |
| 2007/0162235 A1 | 7/2007 | Zhan et al. |
| 2007/0165487 A1 | 7/2007 | Nutt et al. |
| 2007/0199696 A1 | 8/2007 | Walford |
| 2007/0213963 A1 | 9/2007 | Jalali et al. |
| 2007/0216415 A1 | 9/2007 | Clark et al. |
| 2007/0227727 A1 | 10/2007 | Patel et al. |
| 2007/0235185 A1 | 10/2007 | Patel et al. |
| 2007/0271077 A1 | 11/2007 | Kosmala et al. |
| 2009/0272531 A1* | 11/2009 | Montaron ................ 166/252.1 |
| 2011/0006773 A1* | 1/2011 | Bittar ........................ 324/333 |

FOREIGN PATENT DOCUMENTS

| | | |
|---|---|---|
| EP | 1158138 A2 | 11/2001 |
| EP | 0786578 B1 | 12/2005 |
| GB | 2274864 A | 8/1994 |
| GB | 2304764 A | 3/1997 |
| GB | 2333545 A | 7/1999 |
| GB | 2337780 A | 12/1999 |
| GB | 2345137 A | 6/2000 |
| GB | 2360532 A | 9/2001 |
| GB | 2364724 A | 2/2002 |
| GB | 2376488 A | 12/2002 |
| GB | 2381281 A | 4/2003 |
| GB | 2392461 A | 3/2004 |
| GB | 2395315 A | 5/2004 |
| GB | 2395965 A | 6/2004 |
| GB | 2401385 A | 11/2004 |
| GB | 2401430 A | 11/2004 |
| GB | 2401889 A | 11/2004 |
| GB | 2404676 A | 2/2005 |
| GB | 2407334 A | 4/2005 |
| GB | 2408327 A | 5/2005 |
| GB | 2409692 A | 7/2005 |
| GB | 2416871 A | 2/2006 |
| GB | 2419619 A | 5/2006 |
| GB | 2419903 A | 5/2006 |
| GB | 2426019 A | 11/2006 |
| GB | 2428787 A | 2/2007 |
| RU | 2136856 C1 | 9/1999 |
| RU | 2146759 C1 | 3/2000 |
| RU | 2171363 C1 | 7/2001 |
| RU | 2239041 C2 | 10/2004 |
| WO | 9623953 A1 | 8/1996 |
| WO | 9850680 A2 | 11/1998 |
| WO | 9850680 A3 | 11/1998 |
| WO | 9858151 A1 | 12/1998 |
| WO | 9913195 A1 | 3/1999 |
| WO | 0029713 A2 | 5/2000 |
| WO | 0171155 A1 | 9/2001 |
| WO | 0198632 A1 | 12/2001 |
| WO | 03023185 A1 | 3/2003 |
| WO | 2004076815 A1 | 9/2004 |
| WO | 2004094961 A1 | 11/2004 |
| WO | 2005035943 A1 | 4/2005 |
| WO | 2005064116 A1 | 7/2005 |
| WO | 2006010875 A1 | 2/2006 |

OTHER PUBLICATIONS

Saputelli, L. et al. "Real-Time Decision-making for Value Creation while Drilling" SPE/IADC Middle East Drilling Technology Conference & Exhibition, Oct. 2003.

Lanier et al. "Brunei Field Trial of a Fibre Optic Distributed Temperature Sensor (DTS) System in 1,D0Om Open Hole Horizontal Oil Producer" SPE 84324; SPE Annual Technical Conference and Exhibition, Oct. 5-8, 2003.

* cited by examiner

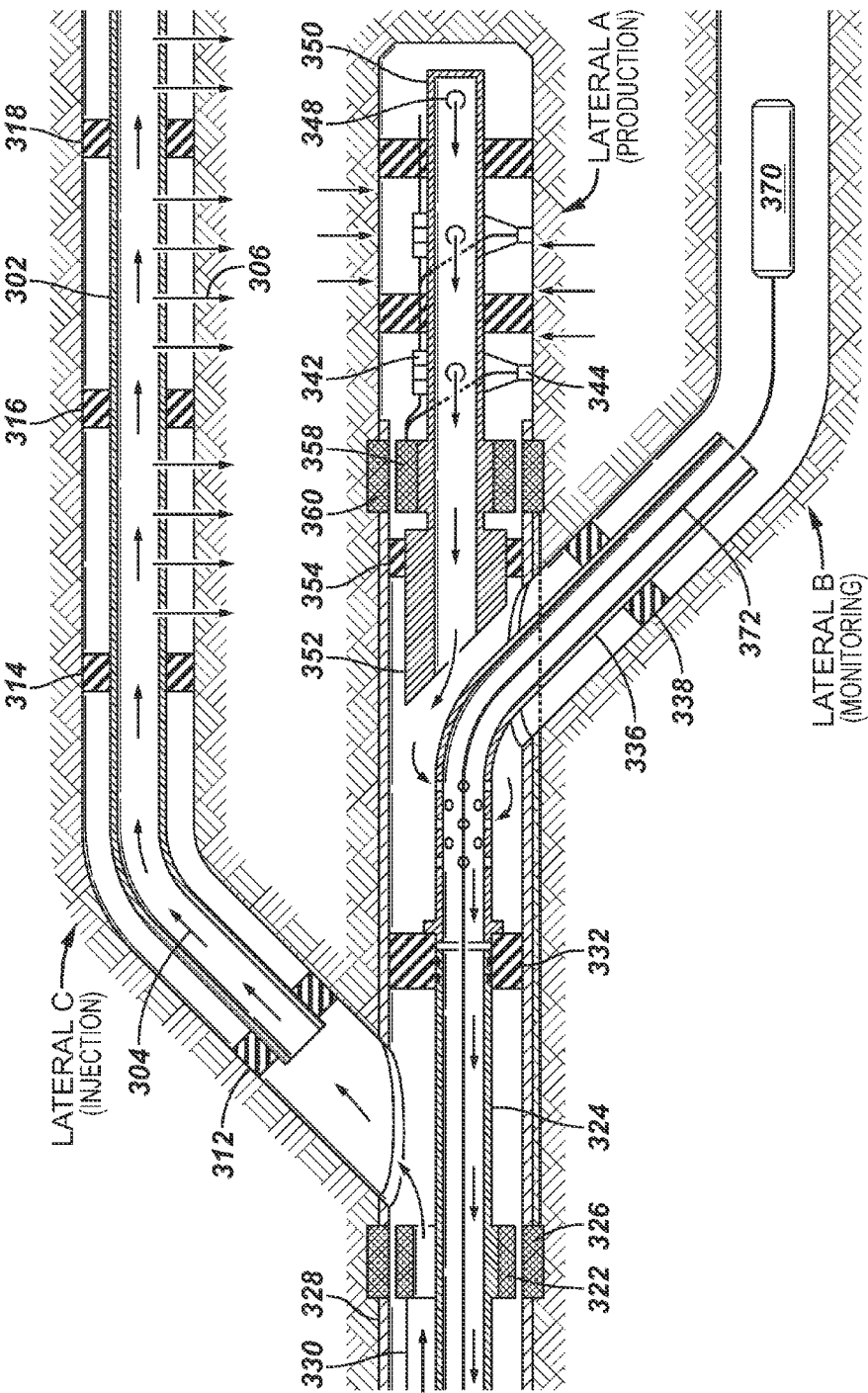

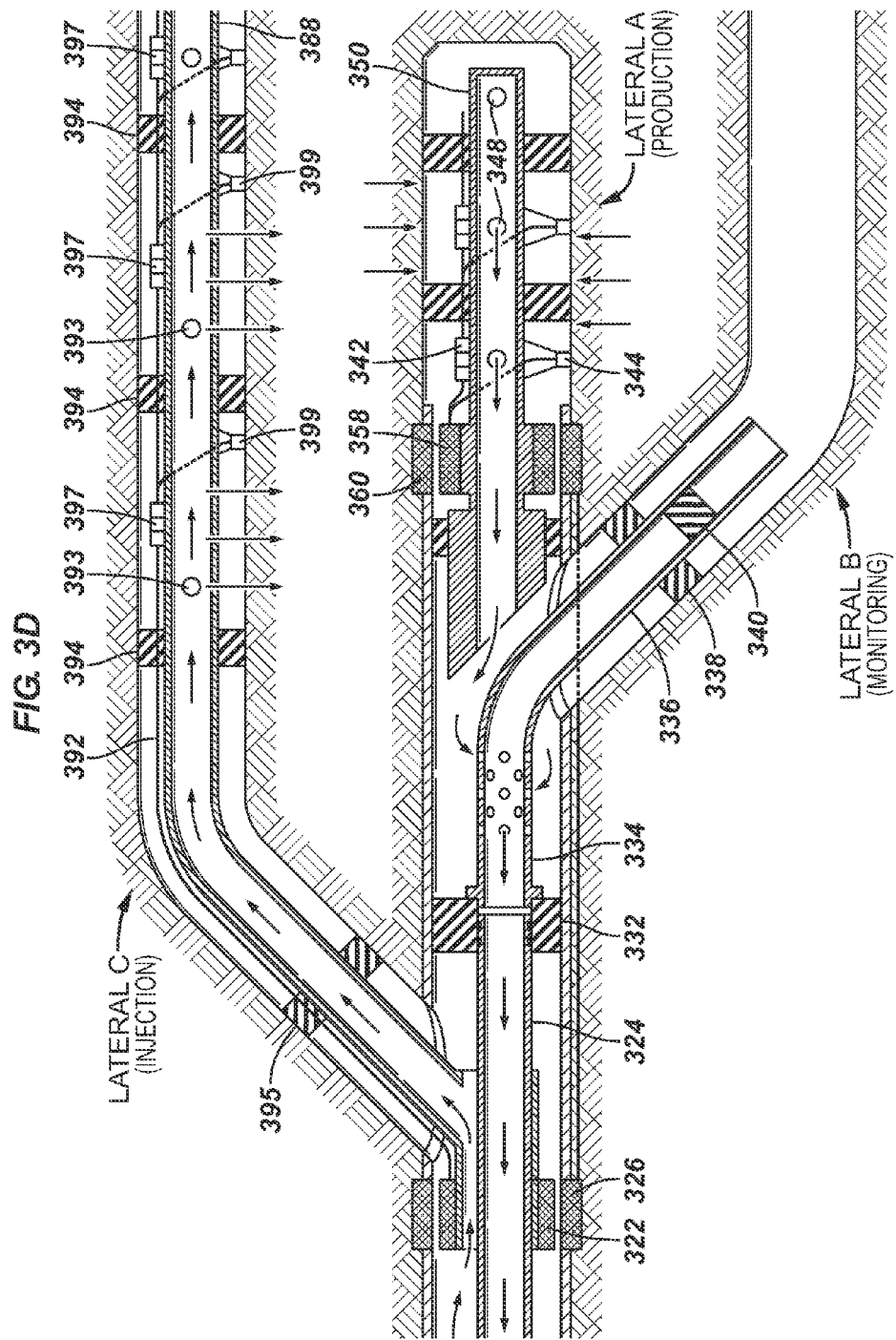

PROVIDING EQUIPMENT IN LATERAL BRANCHES OF A WELL

CROSS-REFERENCE TO RELATED APPLICATION

This application claims the benefit under 35 U.S.C. §119 (e) of U.S. Provisional Application Ser. No. 61/543,100, entitled "Providing Equipment in Lateral Branches of a Well," filed Oct. 4, 2011, which is hereby incorporated by reference.

BACKGROUND

A well can be drilled into a subterranean structure for the purpose of recovering fluids from a reservoir in the subterranean structure. Examples of fluids include hydrocarbons, fresh water, or other fluids. Alternatively, a well can be used for injecting fluids into the subterranean structure.

In some cases, a well can have multiple lateral branches. Equipment can be provided in these lateral branches to perform various well operations.

SUMMARY

In general, according to some implementations, first equipment is provided in a first lateral branch of a well, and second equipment in a second lateral branch of the well. Cross-lateral logging is performed using the first and second equipment in the corresponding first and second lateral branches.

Other features will become apparent from the following description, from the drawings, and from the claims.

BRIEF DESCRIPTION OF THE DRAWINGS

Some embodiments are described with respect to the following figures:

FIGS. 3A-3D illustrate example well equipment of a third arrangement type in a multilateral well having lateral branches, according to additional implementations.

DETAILED DESCRIPTION

Figure 1A:
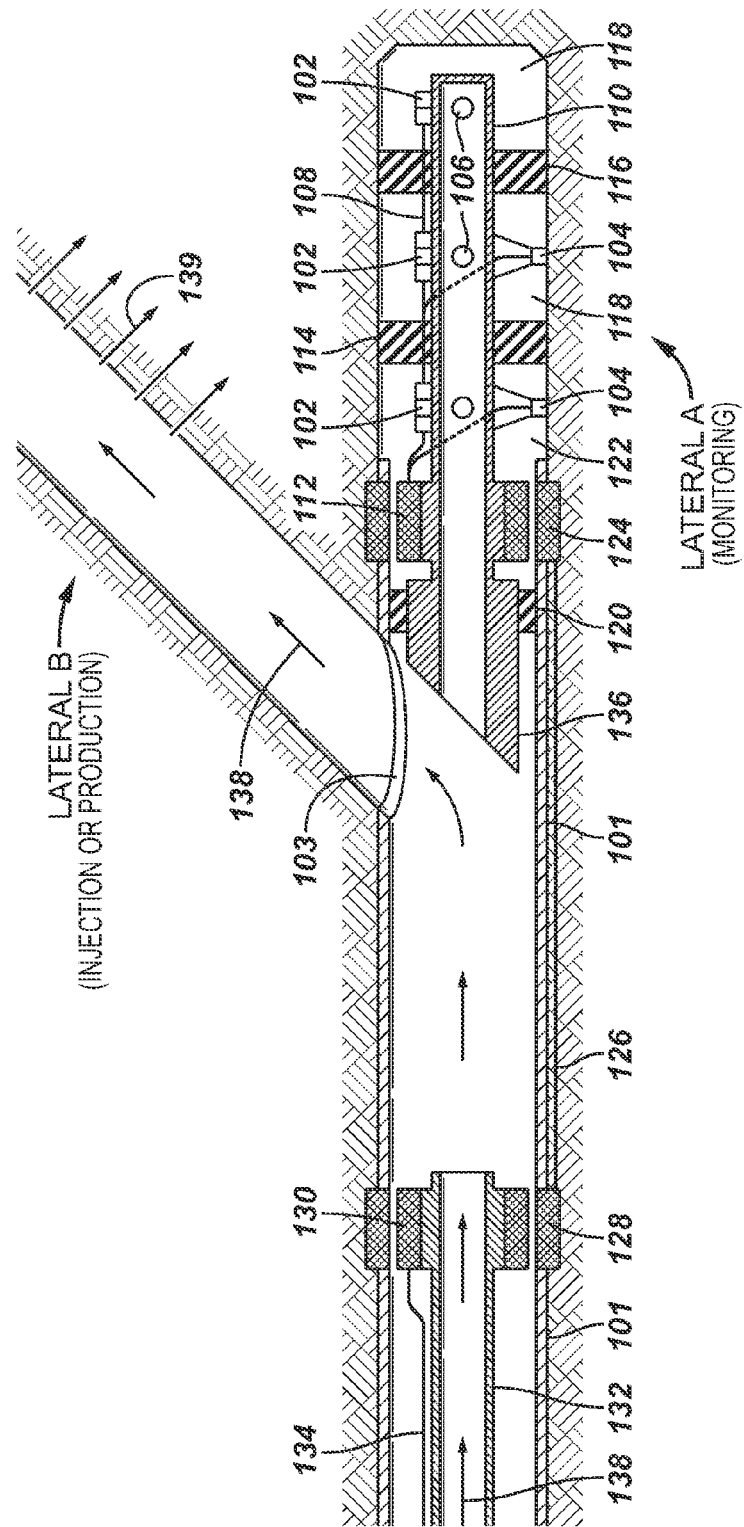
FIGS. 1A-1C illustrate example well equipment of a first arrangement type in a multilateral well having lateral branches, according to some implementations.

As used here, the terms "above" and "below"; "up" and "down"; "upper" and "lower"; "upwardly" and "downwardly"; and other like terms indicating relative positions above or below a given point or element are used in this description to more clearly describe some embodiments. However, when applied to equipment and methods for use in wells that are deviated or horizontal, such terms may refer to a left to right, right to left, or diagonal relationship as appropriate.

Completion equipment can be installed in a well to allow for various operations to be performed, including fluid production and/or injection operations. As examples, the completion equipment can include a casing or liner, fluid conduits (e.g. tubings, pipes, etc.), flow control devices, sand control elements, pumps, sealing elements (e.g. packers), sensors, and so forth.

In a well that has multiple lateral branches (or multiple "laterals"), equipment can be provided in the respective lateral branches to perform various operations, including fluid injection, fluid production, and/or monitoring operations. A well having multiple lateral branches can be referred to as a "multilateral well." A "monitoring operation" can refer to any operation that monitors either a condition in a well or a condition of the surrounding subterranean structure. Examples of monitoring operations include any or some combination of the following: monitoring a front of the fluids as the fluids are injected into an injection lateral branch; monitoring a front of fluids produced into a production lateral branch; monitoring a property of a subterranean structure surrounding a lateral branch or between lateral branches, where the property can include resistivity or any other property; monitoring fluid flow inside a lateral branch; and so forth.

Fluids that can be injected into a well lateral branch can include surfactants, solvents, polymers, engineered water, gas (such as carbon dioxide or hydrocarbon gas), and so forth. In some cases, the cost of the injected fluids can be relatively high. The ability to monitor injection of fluids can result in more cost-effective injection operations. Monitoring injection of fluids can help identify the location of fluid flow paths during stimulation operations, such as acid wormholing, matrix treatments, acid or proppant based fracture treatments, conformance treatments (e.g. injection of polymers for water shutoff, injection of foams and emulsions, etc.), injection of solids or solid particulates (e.g. proppant, sand, polymeric materials, encapsulated solids, nano-particles, magnetic powders, etc.), and so forth.

In accordance with some implementations, equipment can be provided in respective lateral branches of a multilateral well, where such equipment in the lateral branches can be used to perform cross-lateral logging, injection of fluids, production of fluids, and/or other operations. Cross-lateral logging can involve performing a monitoring operation using monitoring equipment in a first lateral branch in response to an operation (e.g. injection, production, etc.) in a second lateral branch. In some implementations, cross-lateral logging can use a signal emitter in a first lateral branch to produce a signal that is emitted into a subterranean structure adjacent the first lateral branch. Also, a signal sensor (or signal receiver) in a second lateral branch is able to receive the emitted signal, as affected by the subterranean structure. The data received by the signal sensor can be processed to identify a property of the subterranean structure. The emitted signal can be an electromagnetic signal. In other examples, the emitted signal can be an electrical current, an electrical voltage, an oscillating current, an acoustic signal, seismic signal, pressure wave, an irradiated nuclear signal such as a gamma ray signal, heat, a pressure pulse, a chemical emission, and so forth. Although reference is made to a signal emitter and a signal sensor, note that in other examples a lateral branch can include multiple signal emitters (e.g. an array of signal emitters) and/or multiple signal sensors (e.g. an array of signal sensors). A lateral branch can also include a signal transceiver (or multiple signal transceivers), where a signal transceiver includes a component to emit (transmit) a signal and a component to receive a signal.

There can be various arrangements of equipment in a multilateral well. In some implementations, the multilateral well can include an injection lateral branch (into which fluids are injected) or production lateral branch (through which fluids can be produced) and a monitoring lateral branch (that includes monitoring equipment to perform a monitoring operation). In other implementations, the multilateral well can include an injection lateral branch and a production lateral branch, where the production lateral branch is used to produce fluids (while the injection of fluids into the injection lateral branch is occurring). In further implementations, the multilateral well can include an injection lateral branch, a production lateral branch, and a monitoring lateral branch. There can be other example configurations as well.

Arrangement Type #1

Figure 1B:
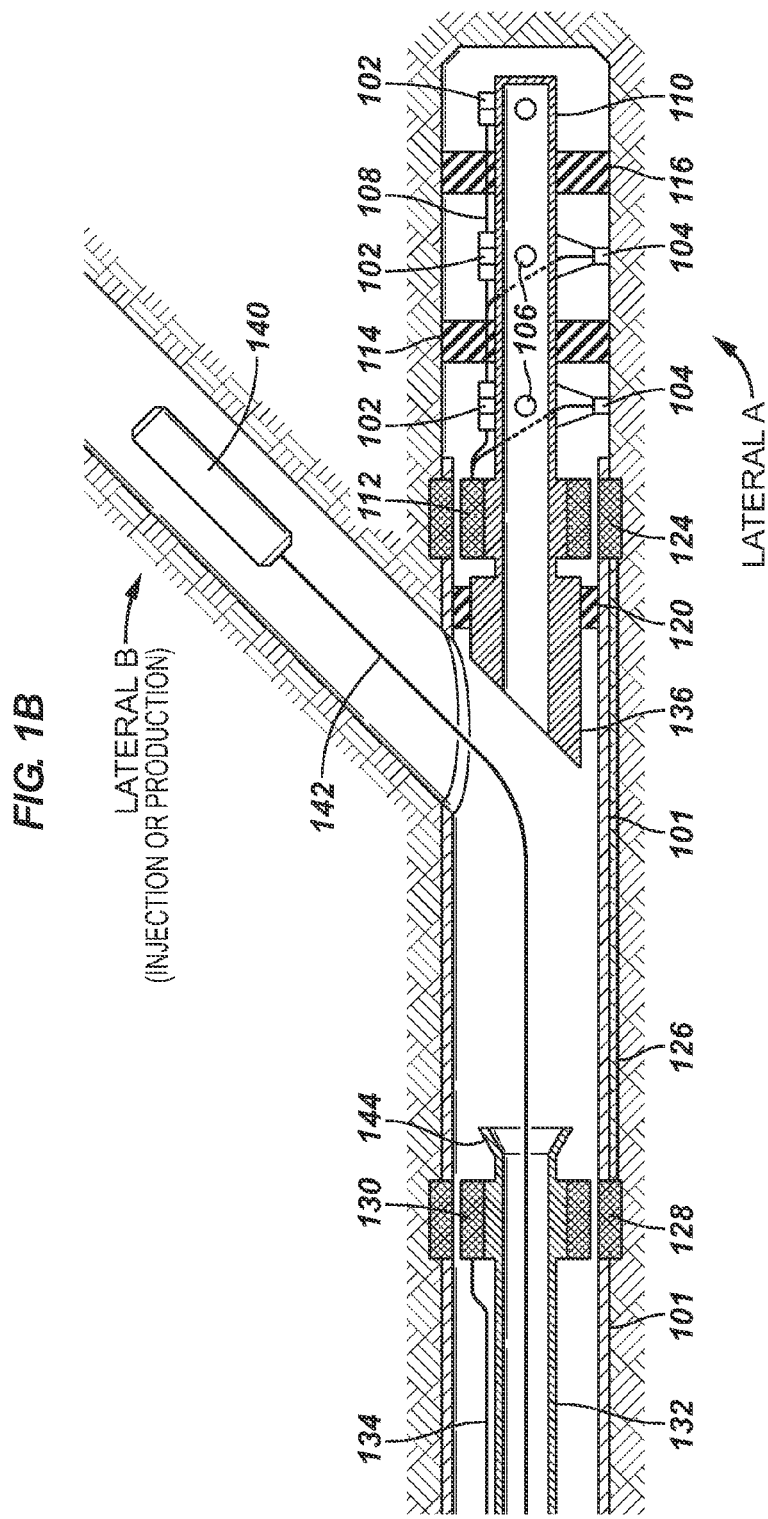
Figure 1C:
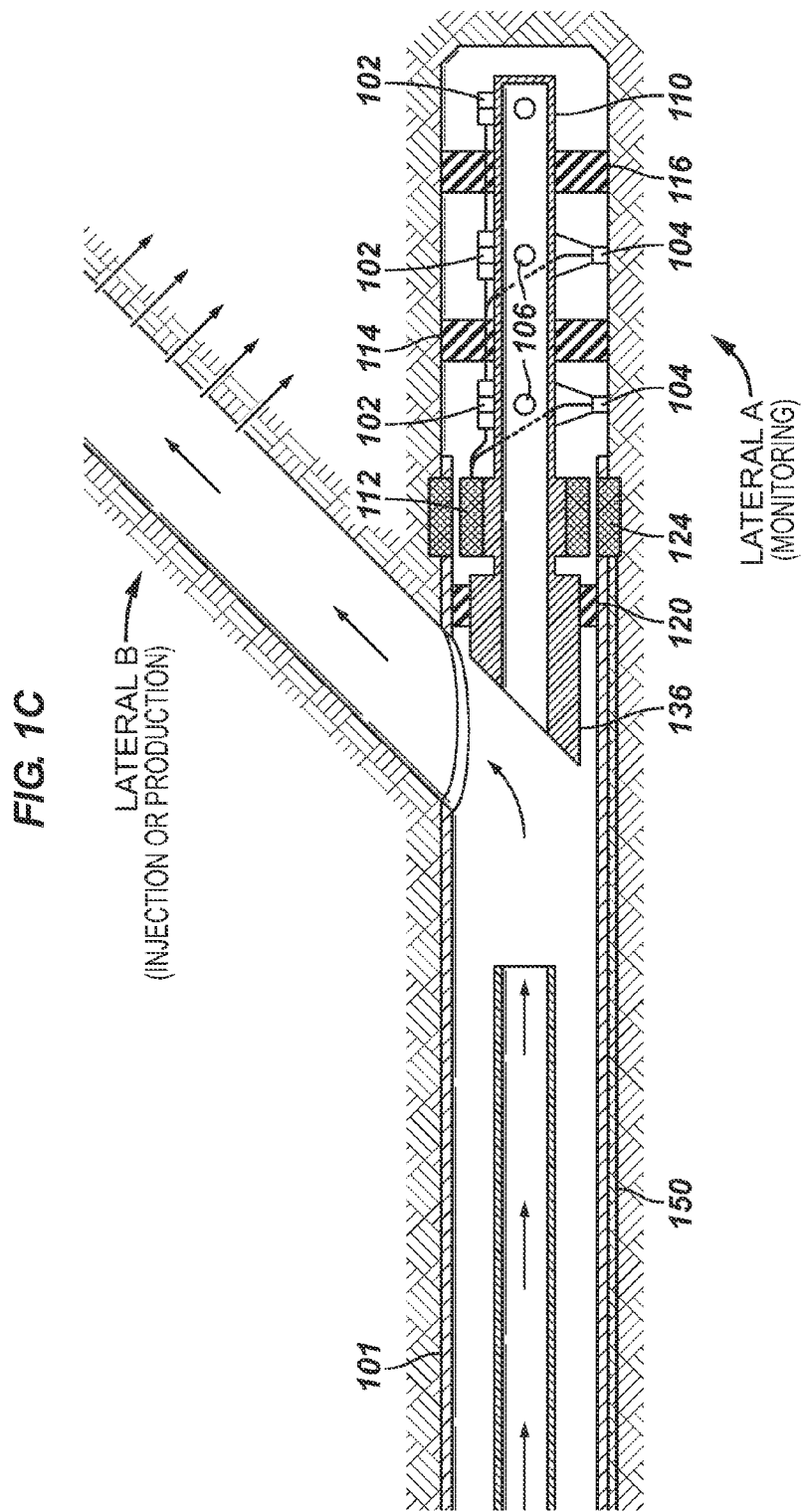

FIGS. 1A-1C depict example well equipment according to arrangement type #1. Although various example configurations of well equipment are shown in FIGS. 1A-1C, it is noted that other example configurations according to arrangement type #1 can be used. Generally, arrangement type #1 includes a monitoring lateral branch (lateral A) and an injection or production lateral branch (lateral B).

Note that various components in the example well equipment can operate using any one or more of the following types of communications: electrical communications, optical communications, hydraulic communications, and so forth.

Electrical communications can be accomplished using an electrical cable. Optical communications can be used using an optical fiber (or optical fibers) through which optical signals can be propagated. Hydraulic communications can be performed using a hydraulic control line through which hydraulic pressure can be applied for controlling a component.

FIG. 1A shows a multilateral well that has a monitoring lateral branch (lateral A) and an injection or production lateral branch (lateral B). Each of laterals A and B can be an open hole well section, or a lined section of a well. As depicted, the well equipment deployed in lateral A (the monitoring lateral branch) includes sensors 102, 104 and flow control devices 106. In further examples, additional and/or other electrical or other activatable devices can be included in the well equipment in lateral A. Additionally, tools can be run into lateral A (such as through a tubing 110 in lateral A) to perform intervention operations, such as logging, mechanical or hydraulic manipulation, pumping, and so forth.

The sensors 102 can be used for measuring various conditions in a wellbore, including one or more of the following characteristics: pressure, temperature, chemical content, salinity, fluid resistivity, gas content, fluid flow rate, fluid capacitance, particulate concentration, and so forth. The sensors 102 are interconnected by an electrical cable 108 to an inductive coupler portion 112. In examples according to FIG. 1A, the sensors 102 and cable 108 are arranged along an outer surface of the tubing 110, which defines an inner conduit through which fluid can flow (and through which an intervention tool can be run).

FIG. 1A also shows isolation packers 114 and 116 (to provide hydraulic isolation) that are engaged between the outer surface of the tubing 110 and the wall of lateral A, to define sealed annular zones 118. FIG. 1A also shows another sealing element 120 located uphole of the packer 114—the sealing element 120 and packer 114 define another sealed annular zone 122. The sealing element 120 is provided on a whipstock 136. The whipstock 136 is a device that allows for deflection of tools into a lateral branch, such as lateral B in FIG. 1A. The tubing 110 is connected below the whipstock 136.

Effectively, the isolation packers 114 and 116 and sealing element 120 provide a segmented completion in lateral A, which includes multiple segments for multiple respective zones.

The sensors 104 can be formation contact sensors, which are sensors that are provided in physical contact with a formation wall. For example, the contact sensors 104 can be mounted on pads or some other mechanism to provide allow physical contact between the contact sensors 104 and the wall of the lateral branch. Examples of formation contact sensors include any one or more of the following: acoustic sensor, geophone, hydrophone, micro-resistivity sensor, electromagnetic sensor, pressure sensor, strain sensor, gamma ray detector, electric dipole measurement sensor, and so forth. In further examples, one or more of the sensors 104 can further include a transmitting element, or in different examples, one or more of the sensors 104 can be replaced with just a signal emitter. Examples of signal emitters include an electromagnetic emitter, a seismic source, an acoustic emitter, and so forth.

The formation contact sensors 104 can be used to detect signals from the adjacent formation (the formation adjacent or surrounding lateral A). An array of the contact sensors 104 (or an arrangement of discrete contact sensors 104) can be used to develop a tomographic image of the medium in the adjacent formation. The formation contact sensors 104 can also be used to detect signals emitted from another lateral, such as lateral B. In this way, a tomographic image of the formation between lateral branches can be developed.

The formation contact sensors 104 can also be connected to the cable 108. Although not shown, the flow control devices 106 can also be connected to the cable 108. The cable 108 can be passed through feed-through paths in the packers 114 and 116.

The inductive coupler portion 112 is positioned adjacent another inductive coupler portion 124. The inductive coupler portion 124 is mounted to a liner 101, which lines a portion of the well depicted in FIG. 1A. A liner is a lining structure used to line a wall of a well. The term "liner" can refer to a casing (which extends to the earth surface), or to a downhole liner that does not extend to the earth surface.

The proximal positioning of the inductive coupler portions 112 and 124 allow the inductive coupler portions to inductively communicate with each other. In some examples, the inductive coupler portion 124 is a female inductive coupler portion that defines an inner bore in which the inductive coupler portion 112 (e.g. a male inductive coupler portion) can be placed to align the inductive coupler portions 112 and 124. The inductive coupler portions 112 and 124 together form an inductive coupler.

An inductive coupler performs communication using induction. Induction involves transfer of a time-changing electromagnetic signal or power that does not rely upon a closed electrical circuit, but instead performs the transfer wirelessly. For example, if a time-changing current is passed through a coil, then a consequence of the time variation is that an electromagnetic field will be generated in the medium surrounding the coil. If a second coil is placed into that electromagnetic field, then a voltage will be generated on that second coil, which is referred to as the induced voltage. The efficiency of this inductive coupling generally increases as the coils of the inductive coupler are placed closer together.

As further shown in FIG. 1A, the female inductive coupler portion 124 on the liner 101 is connected to an electrical cable 126, which extends above the female inductive coupler portion 124 outside the liner 101 to another female inductive coupler portion 128 mounted on the liner 101. The female inductive coupler portion 128 can be inductively coupled to an inductive coupler portion 130, which can be a male inductive coupler portion provided at a lower portion of a completion tubing 132. The male inductive coupler portion 130 on the completion tubing 132 can be aligned (positioned adjacent to) the liner female inductive coupler portion 128 when the completion tubing 132 is lowered into the well and placed in its target position.

The completion tubing 132 has an inner conduit used to perform fluid injection or production. Tools can also be conveyed through the inner conduit of the completion tubing 132. The completion tubing inductive coupler portion 130 is in turn connected by an electrical cable 134, which runs generally along an outer surface of the completion tubing 132. The cable 134 can extend to earth surface equipment, in some examples. In other examples, the cable 134 can extend to another component (such as a downhole controller) that is located in the well but is further uphole than the completion tubing inductive coupler portion 130.

The cables and inductive coupler portions are used for transmission of power and for data telemetry. Power can be delivered from an uphole location (e.g. earth surface equipment or a downhole controller) through the various cables and inductive couplers depicted in FIG. 1A to the sensors and flow control devices in lateral A. Commands to activate (open or close) the flow control devices 106 can also be delivered from an uphole location to the flow control devices 106 through the various cables and inductive couplers. Data acquired by the sensors 102 and 104 can be communicated over the cables and inductive couplers to an uphole location.

In the foregoing discussion, reference has been made to inductive coupler portions and electrical cables to interconnect various components. In other examples, in addition to inductive coupler portions, or in place of inductive coupler portions, other types of coupler portions can be provided, including optical coupler portions and hydraulic coupler portions. Optical coupler portions are provided to allow for optical communications between components. For example, optical coupler portions can include optical lenses and other optical elements to allow for communication of optical signals between the optical coupler portions once they are brought into alignment with respect to each other. If optical coupler portions are provided, then optical cables (including one or more optical fibers) can be provided in place or in addition to the electrical cables depicted in FIG. 1A.

In other examples, hydraulic coupler portions can be provided, which can include hydraulic ports and hydraulic fluid passageways that are sealingly engaged to each other once the hydraulic coupler portions are brought into alignment. In such examples, hydraulic control lines can be used in place of or in addition to the electrical cables and/or optical cables.

If hydraulic communication is enabled, then actuation of hydro-mechanical devices can be performed using hydraulic pressure created by a pressure source (such as at the earth surface). Also, distribution of injected fluids—hydraulic fluids or chemicals—is possible, such as to inject tracers, chemical agents for enhanced fluid recovery, nano-particles, and so forth. The injection rate and location where the fluid is displaced can be controlled from surface or selectively placed using a surface controlled control valve connected to the injection line inside each segment of the well.

In some examples, a hydraulic coupler can include a female hydraulic coupler portion mounted to the liner, and a male hydraulic coupler portion aligned inside the hydraulic coupler portion. The devices in a lateral branch can then be controlled by hydraulic power and signals.

In the ensuing discussion, reference is made to inductive coupler portions and electrical cables. Note, however, that techniques or mechanisms according to some implementations can also be used in arrangements that employ optical coupler portions or hydraulic coupler portions in place of or in addition to inductive coupler portions.

In operation, according to some examples, injection fluids (e.g. liquids, solids, chemicals, polymers, cement, nano-particles, gas, acids, steam, etc.) can be flowed through the inner conduit of the completion tubing 132 (indicated by arrows 138) into lateral B. A liner window 103 (an opening in the liner 101) is formed (such as by milling) to allow for communication between lateral B and the main wellbore. The injected fluids are injected from lateral B into the adjacent formation (indicated by arrows 139).

The sensors 102 and 104 in lateral A can monitor the front of fluids in the formation due to injection of fluids from lateral B. In some examples, these sensors can also be combined with transceivers and/or a logging tool in the injection lateral branch (lateral B) to provide a cross-lateral tomographic image. Measurement data collected by the sensors 102 and 104 can be communicated over the cable 108 to the first inductive coupler formed of portions 112 and 124. The measured data is communicated by this inductive coupler over the cable 126 to the second inductive coupler formed of inductive coupler portions 130 and 128. In turn, this second inductive coupler communicates the measured data over the cable 134 to an uphole location (e.g. earth surface equipment or a downhole controller).

The flow control devices 106 can be selectively actuated between open and closed positions, in response to commands received over the cables and inductive couplers of FIG. 1A. Although not explicitly depicted in FIG. 1A, the flow control devices 106 can be connected to the cable 108 to allow for commands sent from an uphole location (e.g. earth surface equipment or downhole controller) to be communicated to the flow control devices 106 to control actuation of the flow control devices. In some examples, in the context where injection fluid is injected into lateral B, the flow control devices 106 can be selectively opened to allow for production of fluids, pushed by the injected fluids, into the inner conduit of the tubing 110 in lateral A. This action of allowing production of fluids into the inner conduit of tubing 110 can enhance the displacement of the fluids from one lateral branch to another lateral branch, or can be used to clean up near-wellbore fluids that can be damaging to the displacement process.

The flow control devices 106 can be used to enhance the contrast of the fluid front in the formation between the laterals (A and B), or can be used to introduce specific chemicals or treatments into the formation surrounding lateral B for specific purposes.

Instead of the active flow control devices 106 depicted in FIG. 1A (in which the flow control devices 106 can be actively controlled), passive flow control devices can be used instead, where a passive flow control device can include an orifice choke, nozzle, or channel, as examples. Fluid flow through a passive flow control device is based on differential pressure across the orifice choke, nozzle, or channel (in a passive flow control device, there is no actuatable member that is settable between an open position and closed position).

In the ensuing discussion, although reference is made to active flow control devices, it is noted that passive flow control devices can be used instead in some examples.

In another example application, instead of injecting fluids into lateral B, fluid can be injected into lateral A, with the flow control devices 106 selectively opened to allow the injected fluids to pass into respective annular regions 118 and 122 to flow into the adjacent formation. Injection of fluids from lateral A into the adjacent formation causes fluid production into lateral B, where fluid can be flowed from lateral B to the completion tubing 132 (in a direction opposite the direction of the arrows 138). In such example, the sensors 102 and 104 can be used to monitor the front of fluids produced into a production lateral (lateral B).

In this way, the following example applications can be provided by the arrangement of FIG. 1A: detection and control of chemical injection front; detection of wormholing penetration from a matrix acidization treatment; monitoring of fracture penetration; conformance treatment penetration into fractures; positioning of aggregated nano-particles or solid materials within the formation between laterals; and so forth.

FIG. 1B illustrates an example arrangement that is similar to FIG. 1A, except with a few modifications. Components of FIG. 1B that are identical to components of FIG. 1A share the same reference numerals. In FIG. 1B, a logging tool 140 that is carried on a carrier line 142 (e.g. wireline, slickline, coiled tubing, etc.) or that is carried by a downhole tractor is run down through the inner conduit of the completion tubing 132 and is directed by the whipstock 136 into lateral B. According to FIG. 1B, the lower end of the completion tubing can be provided with an entry guide 144, to allow for easier retrieval of logging tool 140 back into the completion tubing 132.

The logging tool 140 can include signal emitters, sensors, or transceivers to transmit or receive signals, including electrical signals, electromagnetic signals, seismic signals, acoustic signals, nuclear signals, and so forth.

In operation, according to some examples, signal emitters in the logging tool 140 can be used to emit signals that are transmitted into the formation between lateral A and B. These emitted signals can be detected by sensors 102 and/or 104 in lateral A.

In other examples, signal emitters in lateral A can be used to emit signals that are propagated through the formation between laterals A and B. The propagated signals can be detected by sensors in the logging tool 140. The sensors of the logging tool 140 can be used to detect a property of the formation between laterals A and B, or to measure a characteristic in lateral B. Also the sensors of the logging tool 140 can be used to sample fluids (and perform chemical detection) at different locations in lateral B.

Assuming that the fluids in the formation between laterals A and B have a physical contrast (such as resistivity, conductance, and so forth), the front of fluids between the two laterals or surrounding the producing lateral can be inferred from measurements by the combination of the sensors in lateral A and sensors in the logging tool in lateral B.

In other examples, signals emitted by emitters of acoustic, electromagnetic, gamma radiation or other such physical emissions can be used for purposes of illuminating a subterranean formation below a casing point allow logging tools to detect physical transmission of such signals through the various layers of the formation. This concept can be used to assist in measurements ahead of a drill bit, such as a drill bit on a drill string provided in lateral B.

FIG. 1C shows another variant of the FIG. 1A arrangement. In FIG. 1C, the inductive coupler portions 128 and 130 of FIG. 1A are omitted. In examples according to FIG. 1C, an electrical cable 150 runs from the inductive coupler portion 124 to an uphole location (e.g. earth surface equipment or downhole controller). The electrical cable 150 can be run outside of the liner 101.

In the various configurations described herein, electrical transceivers can be provided in the lateral branch equipment for emitting high energy electromagnetics and or microwave for purposes of triggering certain chemicals in cement or polymer or other suitable material to change state. For example, microwave energy can be used to set an epoxy seal behind casing, or break encapsulation in cement to activate setting.

Other devices that can be used include arrays of casing corrosion monitoring sensors, cathodic protection terminals behind a liner, and so forth.

Arrangement Type #2

Figure 2A:
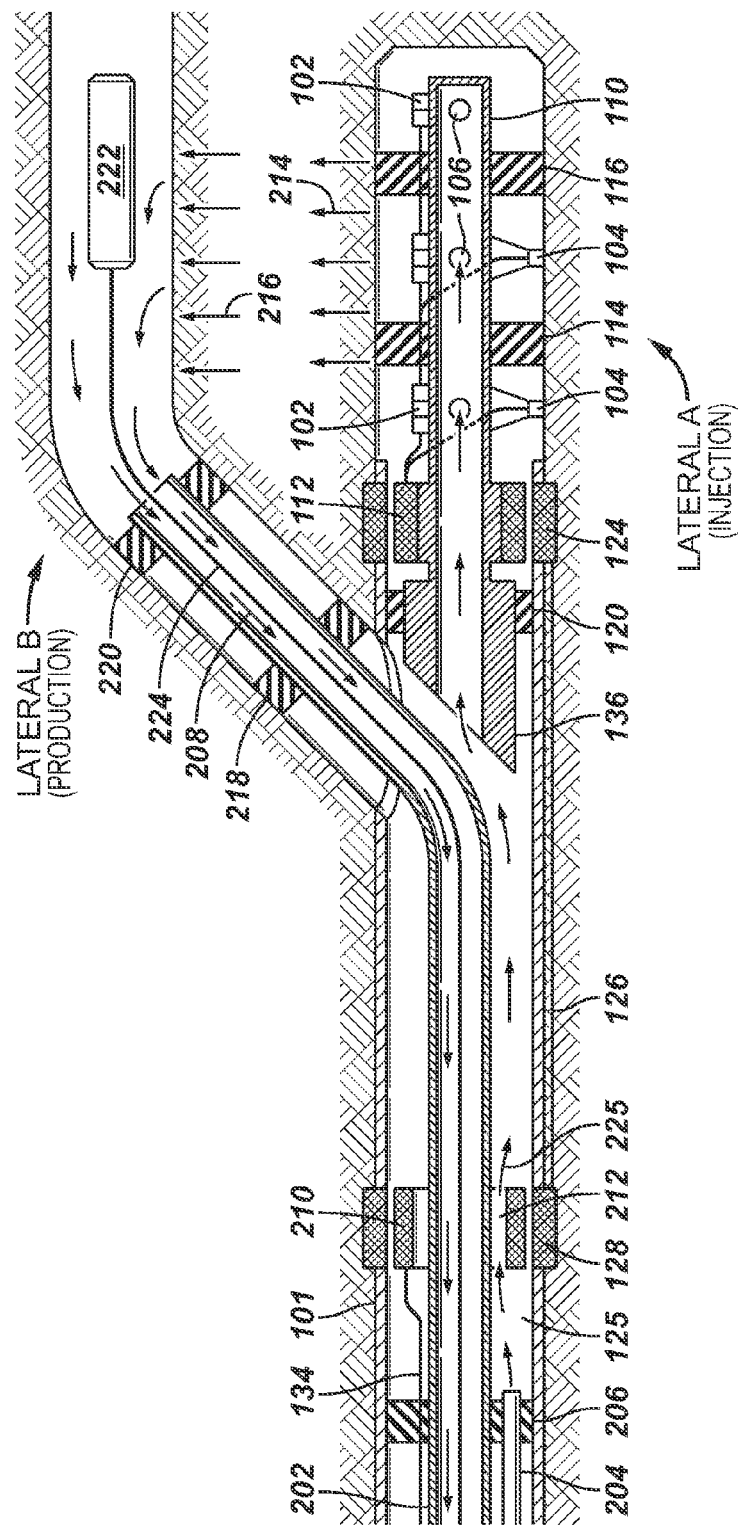
FIGS. 2A-2C illustrate example well equipment of a second arrangement type in a multilateral well having lateral branches, according to further implementations.
Figure 2B:
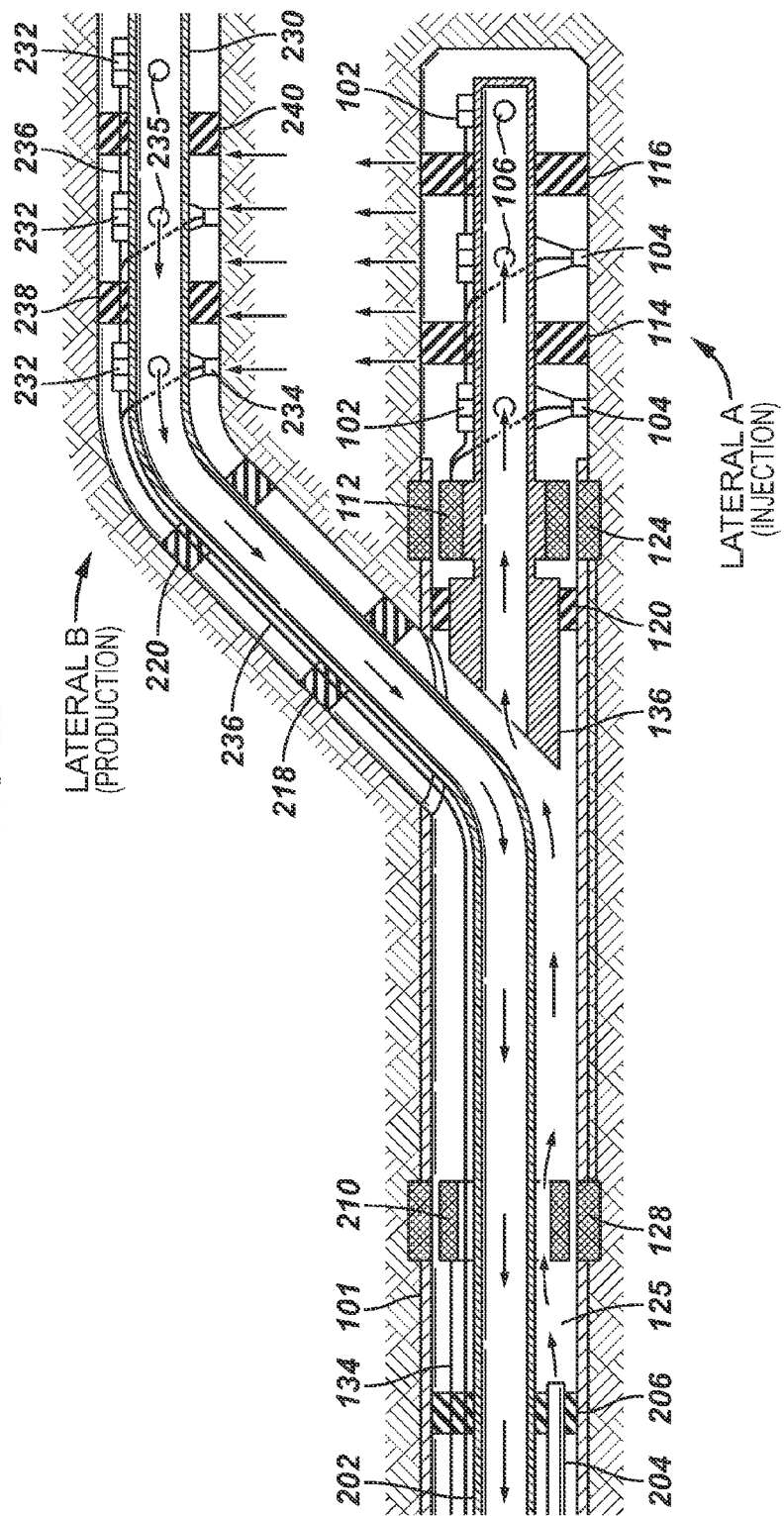
Figure 2C:
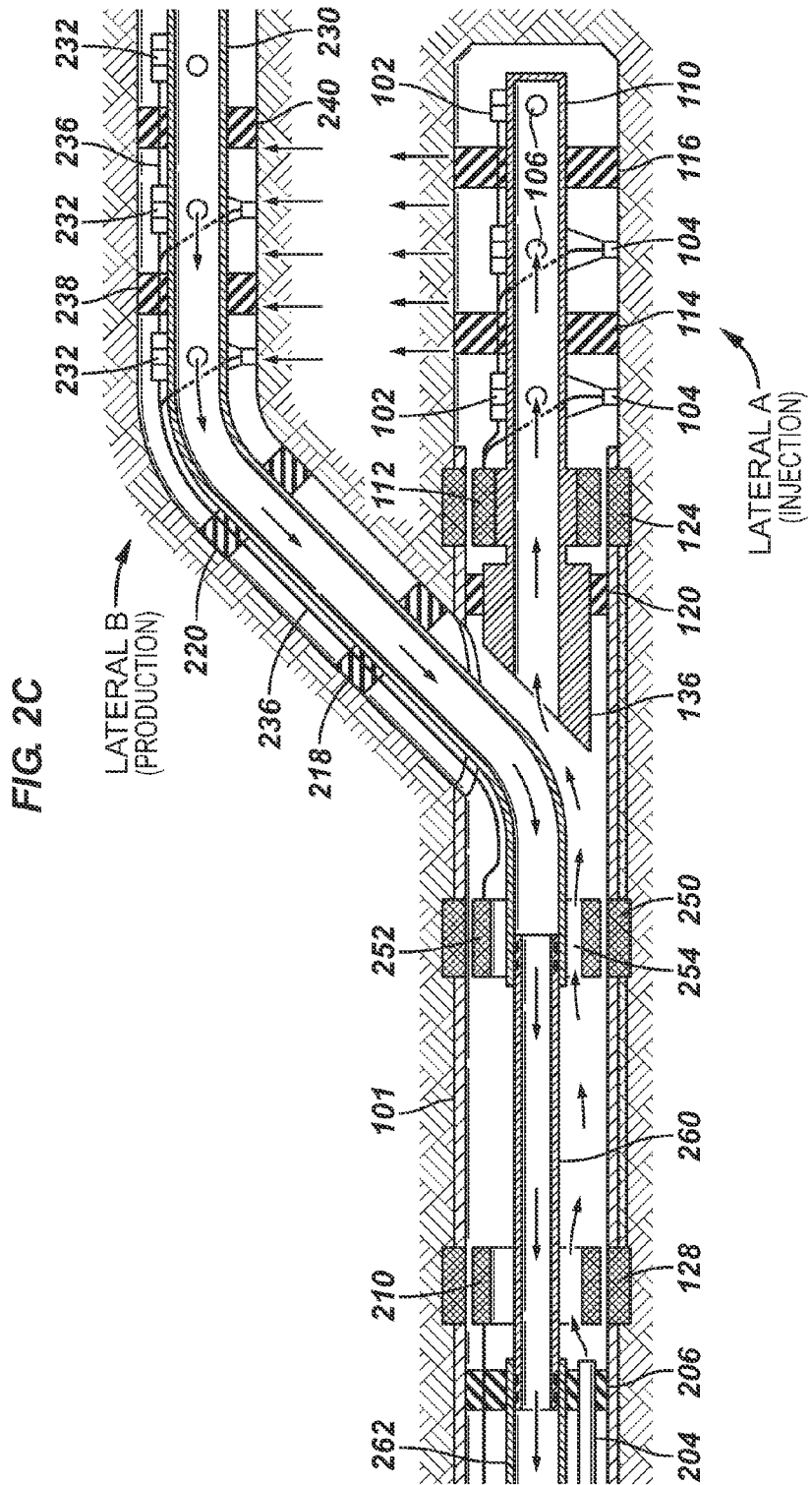

FIGS. 2A-2C depict example well equipment according to arrangement type #2. Generally, the arrangement type #2 includes an injection lateral branch (lateral A) and a separate production lateral branch (lateral B) to allow for simultaneous fluid injection and production.

FIG. 2A illustrates an arrangement of well equipment that can be configured to allow for simultaneous production and injection from different lateral branches, while affording monitoring operations to detect fluid through a formation between the lateral branches. FIG. 2A illustrates the segmented control of injected fluids into lateral A with an open production lateral branch (lateral B) to allow introduction of logging tools. In FIG. 2A, lateral B is left open hole, allowing the intervention of various logging devices to detect fluid flow within the lateral branch or to emit or detect signals to or from the injection lateral sensors/transceivers. In other examples, lateral B can be lined with a liner.

The equipment in lateral A is similar to the equipment in lateral A of FIG. 1A, and thus share the same reference numerals. In the injection lateral branch (lateral A), injected fluids are controlled using electrically (or hydraulically) actuated flow control devices 106, and isolation packers 114 and 116 cause injected fluids to be provided into predetermined locations within the injection lateral branch. This injection arrangement can be altered at any time during the life of the well by manipulation of one or more of the flow control devices. The sensors and/or transceivers placed in the injection lateral branch (lateral A) allow the sensing of the fluids in the injection lateral branch as well as sensing of fluid front movement between the two lateral branches.

In the main wellbore 125 of FIG. 2A, two tubing strings are provided, a "long" tubing string 202 and a "short" tubing string 204. The long tubing string 202 and the short tubing string 204 extend through a dual packer 206 set in the main wellbore 125 against the liner 101. The dual packer 206 has bores through which the long tubing string 202 and short tubing string 204 can extend. In addition, the dual packer 206 has a feedthrough path through which the electrical cable 134 can extend, as shown in FIG. 2A.

In some examples, the long tubing string 202 extends through the main wellbore 125 into lateral B. The short tubing string 204 extends through the dual packer 206 to a location in the main wellbore 125 just below the dual packer 206. The long tubing string 202 can be used for fluid production, while the short tubing string 204 can be used for fluid injection. In different examples, the long tubing string 202 can be used for fluid injection, while the short tubing string 204 can be used for fluid production.

In other examples, instead of using the tubing strings 202 and 204 that are placed side-by-side to perform simultaneous injection and production, two concentric tubings can be used instead (with a second tubing concentrically arranged around a first tubing). An inner conduit of the first tubing can be used as an injection fluid path, while the annular region between the first and second tubings can be used as a production fluid path, or vice versa. As further examples, fluids can be pumped down the annulus between tubing 202 and liner 101.

The short tubing string 204 has an opening that is downhole of the packer 206, such that fluid injected through the short tubing string 204 is injected into an annular region around the long tubing string 202. Fluid that is produced into lateral B flows into the inner conduit of the long tubing string 202, as indicated by arrows 208. The produced fluid can pass through the long tubing string 202 to an uphole location, such as the earth surface or some other uphole location.

As further shown in FIG. 2A, isolation packers 218 and 220 can be set between the long tubing string 202 and the wall of lateral B, to provide hydraulic isolation. By using the various sealing elements depicted in FIG. 2A, the injection fluid path and production fluid path are isolated from each other.

As with the FIG. 1A implementation, the liner 101 is mounted with the female inductive coupler portion 128. A male inductive coupler portion 210 is mounted on the long tubing string 202. The male inductive coupler portion 210 can have a flow-through passageway 212 through which injected fluid that flows from the short tubing string 204 can pass (as indicated by arrows 225). The injected fluid passes through the flow-through passageway 212 of the male inductive coupler portion 210 and into the inner conduit of the tubing 110 that is in lateral A. The male inductive coupler portion 210 can be referred to as a flow-through male inductive coupler portion.

When the flow control devices 106 on the tubing 110 are opened, the injected fluids can pass through the flow control devices 106 into the adjacent formation, as indicated by arrows 214. The injected fluids push fluids in the formation into lateral B as production fluids (as indicated by arrows 216).

FIG. 2A also shows a logging tool 222 (which can be similar to the logging tool 140 in FIG. 1B) that is carried on a carrier line 224 (or by a tractor). The logging tool 222 in lateral B can cooperate with the equipment in lateral A to perform cross-well logging.

FIG. 2B shows another example arrangement that is similar to the arrangement of FIG. 2A, except that in FIG. 2B, the long tubing string 202 of FIG. 2A has been extended with another tubing string section 230 in lateral B. In FIG. 2B, the logging tool 222 of FIG. 2A is omitted. Instead, the tubing string section 230 is provided with various sensors 232 on the outside of the tubing section 230, as well as formation contact sensors 234. The sensors 232 and 234 are similar to the sensors 102 and 104 in lateral A discussed above in connection with FIG. 1A.

The sensors 232 and 234 are connected to an electrical cable 236. The electrical cable 236 can pass through feed through paths in isolation packers 238 and 240 mounted to the tubing section 230 for isolating respective zones in lateral B. In addition, the cable 236 can extend through isolation packers 218 and 220, and through the fluid passageway 212 of the inductive coupler portion 210 and through the dual packer 206 to an uphole location, such as the earth surface or some other uphole location.

The tubing string section 230 is also provided with flow control devices 235 (similar to flow control devices 106 in lateral A). In FIG. 2B, both laterals A and B are provided with segmented control for injection and/or production operations. The segmented control is achieved by use of the isolation packers depicted in FIG. 2B, as well as the multiple flow control devices (235 and 106) for flow control in the respective different zones defined by the isolation packers.

FIG. 2C shows another example arrangement that is a variant of the arrangement of FIG. 2B. The arrangement of FIG. 2C has another female inductive coupler portion 250 mounted on the liner 101. In addition, a male inductive coupler portion 252 is positioned adjacent the female inductive coupler portion 250. The male inductive coupler portion 252 has an annular flow passageway 254 through which injection fluids can pass. According to FIG. 2C, the electrical cable 236 from lateral B is connected to the female inductive coupler portion 252 (rather than to an uphole location as in FIG. 2B). The liner inductive coupler portion 250 is connected to the cable 126, which is also connected to the liner inductive coupler portion 128. By adding the inductive coupler portions 250 and 252 in the arrangement of FIG. 2C, the dedicated cable 236 of FIG. 2B that extends to the earth surface can be omitted; instead, communications between the equipment in lateral B and an uphole location can employ the inductive couplers depicted in FIG. 2C.

FIG. 2C also uses a straddle tubing 260, which interconnects a long tubing string 262 and the tubing string section 230. The straddle tubing 260 is designed to hydraulically connect the long tubing string 262 with the tubing string section 230 in lateral B. A series of production seals, such as v-packings, bonded seals, or other similar seals, can provide hydraulic integrity in the connections between the straddle tubular 260 and the long production string 262 and the tubing string section 230. The straddle tubing 260 can be configured to run and lock in a nipple profile using a carrier line or a tractor. Use of the straddle tubing 260 facilitates the installation of the production lateral tubing section 230 as the straddle tubing 260 decouples the tubing string section 230 from the long tubing string 262 when installing the tubing string section 230. Once the tubing string section 230 has been installed, the straddle tubing 260 can be run and set in place.

Using the example arrangements depicted in FIGS. 2A-2C, which are according to arrangement type #2, various features can be provided. For example, the arrangement type #2 can allow for simultaneous injection and production of fluids in a multilateral well, such that a dedicated injection lateral branch and a dedicated production lateral branch are provided. The arrangement type #2 also allows for the installation of permanent monitoring devices such as sensors and/or transceivers in one or both of the lateral branches of the multilateral well. These monitoring devices (whether or not combined with logging tools) can perform cross-well logging between laterals branches.

Although FIGS. 2A-2C show lateral A as being the injection lateral branch and lateral B as being the production lateral branch, in other examples, lateral B can be the injection lateral branch while lateral A can be the injection lateral branch.

Arrangement Type #3

FIGS. 3A-3D depict example well equipment according to arrangement type #3. Generally, the arrangement type #3 includes a monitoring lateral branch, an injection lateral branch, and a production lateral branch. The monitoring lateral branch is used to perform monitoring of fluid flow in the formation between an injection lateral branch and a production lateral branch of a multilateral well. Such arrangement can be used for early injection pilots where the construction of many wells can be based upon the success of this pilot. This can be useful in remote or environmentally sensitive areas, in subsea applications, or in extended reach or offshore applications where the cost and or regulations or risks can be relatively high.

Figure 3A:
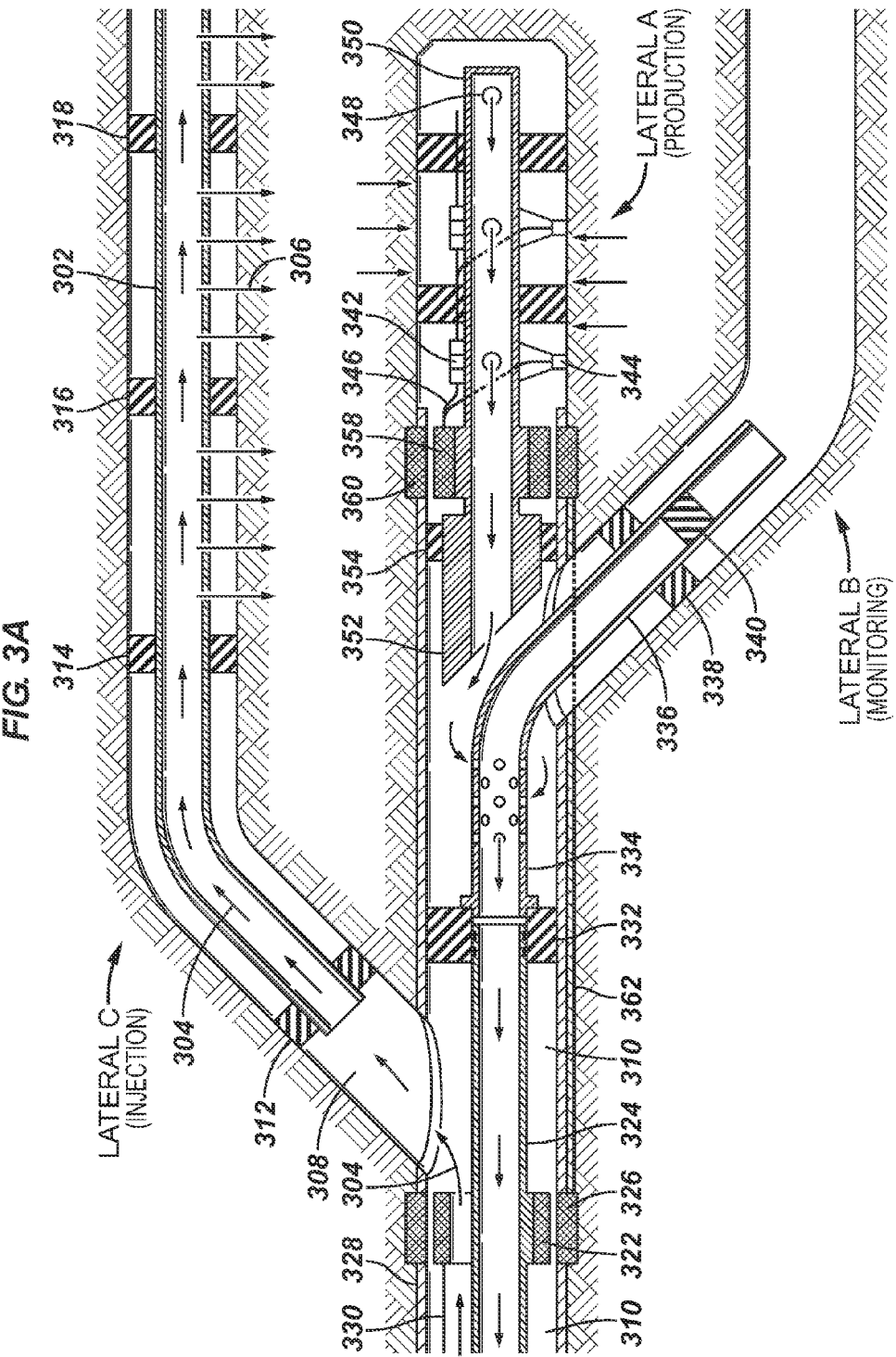

As shown in FIG. 3A, an arrangement that has an injection lateral branch (lateral C), a production lateral branch (lateral A), and a monitoring lateral branch (lateral B) allows for simultaneous production and injection of fluids in different lateral branches, while providing a dedicated monitoring lateral branch. The position of the monitoring lateral branch is arbitrary with respect to the injection and production lateral branches, but can be provided to allow relatively efficient monitoring of the fluid position within the formation between the injection and production lateral branches.

FIG. 3A shows an example in which the injection lateral branch (lateral C) includes an injection tubing string 302 that includes passive flow control devices (e.g. choke orifices, nozzles, channels). The passive flow control devices provided along the tubing string 302 allows for injection (or production) of fluids along the length of the tubing string 302. In the context of fluid injection, the injection fluid (indicated by arrows 304 in the interior conduit of the tubing string 302) passes through orifice chokes, nozzles, or channels in the passive flow control devices in a way in which the flow of fluids from inside the inner conduit of the tubing string 302 to outside the tubing string 302 (as indicated by arrows 306) is determined based on the differential pressure between the inner conduit and the outside of the tubing string 302. In other implementations, instead of using passive flow control devices, active flow control devices (controlled by electrical commands, pressure pulse commands, or RFID (radio frequency identification) tags pumped in with injected fluids, for example) can be used.

The tubing string 302 extends in lateral C to a location 308 closer to the junction with a main wellbore 310. An isolation packer 312 is provided at the upper portion of the tubing string 302 to provide fluid isolation between lateral C and the main wellbore 310. In addition, isolation packers 314, 316, and 318 are provided along the tubing string 302 to isolate respective zones (that are isolated from each other) in lateral C.

Injection fluid flows through the main wellbore 310 along an annular path indicated by arrow 304. The annular path is provided outside the main wellbore tubing string 324. The injection fluid passes through a flow passageway of a male inductive coupler portion 322 that is mounted to the main wellbore tubing string 324. The male inductive coupler portion 322 is positioned adjacent a female inductive coupler portion 326 that is mounted to a liner 328. An electrical cable 330 is connected to the male inductive coupler portion 322, and the electrical cable 330 extends to an uphole location (e.g. earth surface or some other uphole location).

The lower end of the main wellbore tubing string 324 is engaged with a seal bore packer 332. The seal bore packer 332 has an inner seal bore in which the lower end of the main wellbore tubing string 324 can be engaged to seal hydraulically.

In addition, a perforated tubing joint 334 is attached to the seal bore packer 332. The perforated tubing joint 334 has perforations in the housing of the perforated tubing joint, where fluids (e.g. production fluids) are allowed to flow through these perforations into an inner conduit of the perforated tubing joint.

The perforated tubing joint 334 is connected to another tubing section 336, which extends into the monitoring lateral branch (lateral B). An isolation packer 338 is set around the lateral B tubing section 338 to isolate lateral B from the main wellbore 310. In addition, in FIG. 3A, a plug 340 is located inside the inner conduit of the tubing section 336, to block fluid flow in the inner conduit of the tubing section 336. The plug 340 is retrievable—retrieval of the plug 340 allows for fluid flow through the inner conduit of the tubing section 336, as well as deployment of a tool through the tubing section 336. The plug 340 can be hydraulically actuated by a control line run outside of tubing section 336 up to a hydraulic wet mate connection at 332. The hydraulic wet mate connection at 332 can hydraulically connect to a hydraulic control line (not shown) run outside of tubing string 324 to the earth surface or other uphole location.

As explained further below, after the plug 340 is retrieved, a logging tool can be deployed through the tubing section 336 into lateral B for performing monitoring operations according to various implementations.

The production lateral branch (lateral A) includes various equipment, including sensors 342 and 344, which are similar to sensors 102 and 104 discussed above in connection with FIG. 1A. The sensors 342 and 344 are connected to an electrical cable 346. Flow control devices 348 are also provided on a tubing 350, inside lateral A. The upper end of the tubing 350 is connected to a whipstock 352, which has a sealing element 354 set against the liner 328 to provide isolation between lateral A and the main wellbore 310.

The electrical cable 346 is connected to a male inductive coupler portion 358 that is mounted on the tubing 350. The male inductive coupler portion 358 is adjacent a female inductive coupler portion 360 mounted to the liner 328.

The female inductive coupler portion 360 is connected to an electrical cable 362, which extends outside the liner 328 to the female inductive coupler portion 326.

In operation, injection fluid is flowed into lateral C (the injection lateral branch). The injection fluid flows into the adjacent formation around lateral C, which causes production fluid to flow into the production lateral branch (lateral A). The flow control devices 348 in the equipment provided in the production lateral branch (lateral A) can be selectively activated to control production flow through selected zones.

To allow for monitoring of fluid flow in the formation between the injection lateral branch and the production lateral branch, a logging tool can be provided into the monitoring lateral branch (lateral B) as depicted in FIG. 3B.

FIG. 3B shows the arrangement of FIG. 3A, except with the plug 340 in the tubing section 336 removed. In FIG. 3B, a logging tool 370 (carried on a carrier line 372 or by a tractor) has been deployed through the main wellbore tubing string 324 and through the tubing section 336 into lateral B. The logging tool 370 can perform cross-well logging operations, including monitoring fluid flow through the formation between laterals C and A.

Figure 3C:
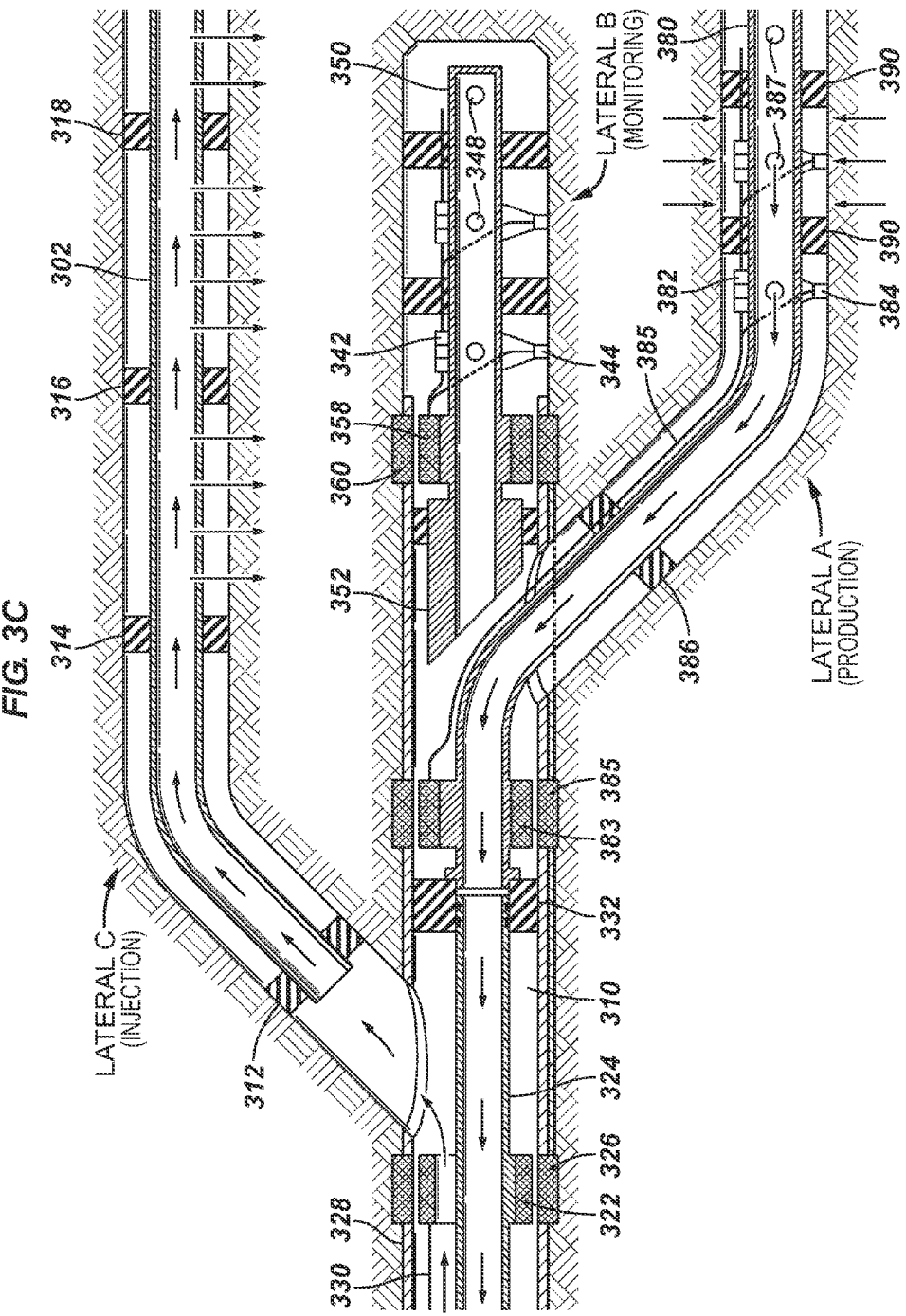

FIG. 3C is similar to the arrangement of FIG. 3A, except that the monitoring lateral branch (lateral B) is provided between the production lateral branch (lateral A) and the injection lateral branch (lateral C). The equipment in the monitoring lateral branch (lateral B) is the same as the equipment used in the production lateral branch (lateral A) shown in FIG. 3A, and thus the components are assigned the same reference numerals.

The production lateral branch (lateral A) is provided with a tubing string 380, which has respective sensors 382 and 384 (similar to sensors 102 and 104 in FIG. 1A), as well as flow control devices 387. The sensors 382 and 384 and flow control devices 387 can be connected to a cable 385, which can extend through the packers 386 and 390 to male inductive coupler portion 383 that is positioned adjacent female inductive coupler portion 385 that is mounted to the liner 328. An electrical cable 391 connects the female inductive coupler portions 326 and 385.

The isolation packers 390 provided on the tubing 380 define isolated zones. In addition, the isolation packer 386 is also provided at an upper portion of the tubing string 380 in the production lateral branch (lateral A) to isolate lateral A from the main wellbore 310.

FIG. 3D illustrates a variant of the FIG. 3A arrangement. In FIG. 3D, instead of using the passive flow control devices in the injection tubing string 302 of FIG. 3A, active flow control devices 393 provided along the injection tubing string 388 are used instead. The actively controlled tubing string 388 can include various sensors 397 and 399 connected to an electrical cable 392. In addition, the flow control devices 393 are connected to the electrical cable 392, which extends through various isolation packers 394 and 395 to the inductive coupler portion 322. The flow control devices 393 can be selectively activated in response to commands over the cable 392.

Well/Lateral Design

The designs of lateral branches can depend on the type of treatment being monitored. One type of treatment is miscible gas injection, in which gas is mixed with other fluids. It may be desirable to use sensors in the various arrangements discussed above to detect gravity segregation of fluids (fluids are separated due to gravity). For example, a lateral branch in a multilateral well can be designed to extend vertically or at least have a vertical component above the injection points.

In another example, for injection of chemical agents that alter fluid mobility within a formation, an area-spaced lateral branch(es) (a lateral branch spaced from another lateral branch) may be beneficial to determine the viscous fingering propensity of the fluids injected. Injection of a less viscous fluid can displace a more viscous fluid in a formation, which can result in creation a pattern in a morphologically unstable interface between the two fluids in a porous medium.

In some examples, a lateral branch can be of a "corkscrew" type, which "winds" itself around a main injection bore. This can allow the placement of sensors (or logging tools) to have detection points above, below, and at radial spacing from the main injection bore.

In another example, a "meandering" lateral branch can be used, where the direction and position of this lateral branch are designed to focus monitoring (or emitting) devices on studying certain aspects of the intra-lateral region, such as a subterranean region exhibiting heterogeneity, a region having a cluster of fracture clusters, and so forth.

More generally, a path of a second lateral branch (with respect to a first lateral branch) can be defined to allow for acquisition of a desired image (of fluid movement) between the first and second lateral branches. The two (or more) lateral branches can be parallel, can be vertically or areally spaced apart, or can have a more complex relative arrangement (e.g. corkscrew or meandering as noted above).

Another application may involve targeting drilling of well paths that would benefit from a level of reservoir "illumination" while drilling. An example would be to initially drill a first lateral branch into, below or above a formation of interest. Once drilled, a liner can be set and certain electrically or hydraulically driven devices (e.g. signal emitter(s) and/or signal receiver(s)) can be placed therein. These devices can be designed to emit electromagnetic, acoustic or other signals into the formation surrounding the lateral branch. A second lateral branch can then be drilled with specific detection devices that utilize the emitted signals from the first lateral branch (and/or emitted signals from a main wellbore) to detect changes in the formation or fluids within that the well is targeted in penetrating. This can be repeated for multiple laterals. With such application, the following can be performed, for example: identification of rich organic content shales in a shale oil or gas play, identification of bypassed hydrocarbons, detection of certain formation types, identification of zones of high pressure contrast, safe drilling of wells (while avoiding collision) where wells are designed to be in close proximity, and so forth.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
providing first equipment in a first lateral branch of a well;
providing second equipment in a second lateral branch of the well;
performing cross-lateral logging using the first and second equipment in the corresponding first and second lateral branches;
injecting a fluid into one of the first lateral branch or the second lateral branch; and
using the cross lateral logging to monitor a front of fluid in a formation into which the first lateral branch and the second lateral branch extend.

2. The method of claim 1, wherein providing the first equipment comprises providing a signal emitter in the first lateral branch, and wherein providing the second equipment comprises providing a signal sensor in the second lateral branch.

3. The method of claim 2, wherein providing the first equipment comprises providing one of a permanent well equipment and a logging tool, and wherein providing the second equipment comprises providing one of a permanent well equipment and a logging tool.

4. The method of claim 1, wherein injecting comprises injecting fluid into the first lateral branch, wherein the second lateral branch is a monitoring branch; and further comprising monitoring the injecting of the fluid using the second equipment in the second lateral branch.

5. The method of claim 1, wherein injecting comprises injecting fluid into the first lateral branch; and as fluid is injected into the first lateral branch, producing fluid from the second lateral branch.

6. The method of claim 1, further comprising:
monitoring a subterranean structure adjacent the second lateral branch using a sensor in the second lateral branch.

7. The method of claim 1, wherein the first equipment includes a logging tool, and the second equipment includes an array of sensors or an array of transceivers,
wherein performing the cross-lateral logging comprises performing monitoring of a subterranean structure between the first and second lateral branches using the logging tool and the array of sensors or array of transceivers.

8. The method of claim 1, wherein the first lateral branch is an injection lateral branch into which fluids are injected, and the second lateral branch is a monitoring lateral branch, the method further comprising:
producing fluids from a third lateral branch of the well.

9. The method of claim 1, further comprising using one or more inductive couplers to provide electrical communication with one or both of the first equipment and second equipment.

10. The method of claim 9, further comprising using hydraulic couplers to provide hydraulic communication with one or both of the first equipment and second equipment.

11. The method of claim 9, further comprising using optical couplers to provide optical communication with one or both of the first equipment and second equipment.

12. The method of claim 1, further comprising:
providing one or more flow control devices in one or both of the first and second lateral branches to control fluid flow.

13. The method of claim 1, further comprising guiding drilling of the second lateral branch based on deployment of one of a signal emitter or a signal receiver in the first lateral branch or in a main wellbore.

14. The method of claim 1, further comprising defining a path of the second lateral branch to allow for acquisition of an image between the first and second lateral branches.

15. A system for use in a multilateral well having lateral branches, comprising:
 first equipment for deployment in a first of the lateral branches; and
 second equipment for deployment in a second of the lateral branches,
 wherein the first and second equipment are arranged to cooperate to perform cross-lateral logging, at least one of the first and second equipment further comprising a flow control device actuatable based on data from the cross lateral logging to affect a fluid front between the first and second laterals.

16. The system of claim 15, wherein the second equipment includes a sensor to detect signals in a formation adjacent the second lateral branch.

17. The system of claim 16, further comprising an electrical cable and an inductive coupler, the sensor connected to the electrical cable, and the inductive coupler to enable communication between the sensor and an uphole component.

18. The system of claim 16, wherein the second equipment further includes the flow control device that is selectively activatable to block or allow fluid flow.

19. The system of claim 16, wherein the first equipment includes a logging tool for deployment into the first lateral branch, where the logging tool has a signal emitter, and the sensor is to detect a signal transmitted by the signal emitter as affected by the formation between the first and second lateral branches.

20. The system of claim 15, further comprising third equipment for deployment in a third of the lateral branches, wherein the first lateral branch is for injection of fluids, and the third lateral branch is for production of fluids.

21. The system of claim 15, wherein the first equipment includes flow control devices.

22. The system of claim 21, wherein the flow control devices are selected from the group consisting of active flow control devices and passive flow control devices.

* * * * *